H. D. WILLIAMS.
METHOD OF CUTTING LONGITUDINALLY CURVED TEETH ON GEAR WHEELS.
APPLICATION FILED NOV. 4, 1916.
1,404,504.
Patented Jan. 24, 1922.
2 SHEETS—SHEET 1.
Fig. 4.
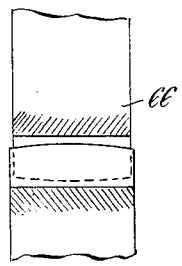
Fig. 3.
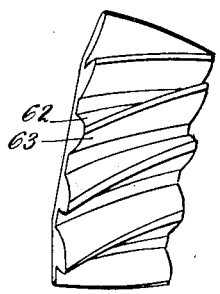
Fig. 1.
Fig. 5
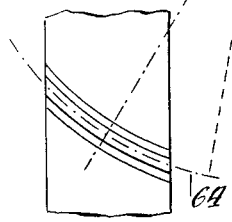
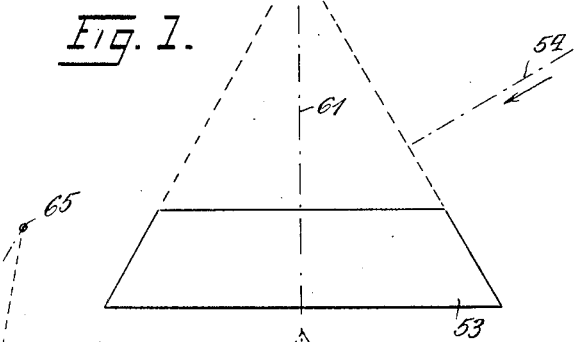
Fig. 2.
Fig. 13.
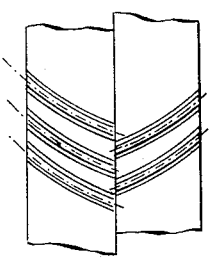
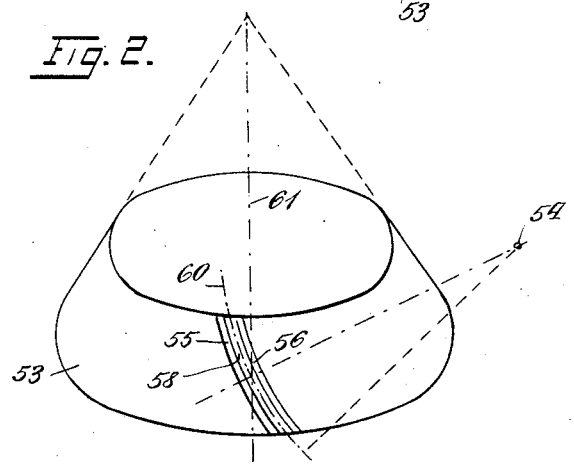
Inventor:
Harvey D. Williams
By his Atty
John Lotka H. D. WILLIAMS.
METHOD OF CUTTING LONGITUDINALLY CURVED TEETH ON GEAR WHEELS.
APPLICATION FILED NOV. 4, 1916.
1,404,504.  Patented Jan. 24, 1922.
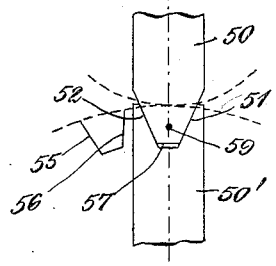
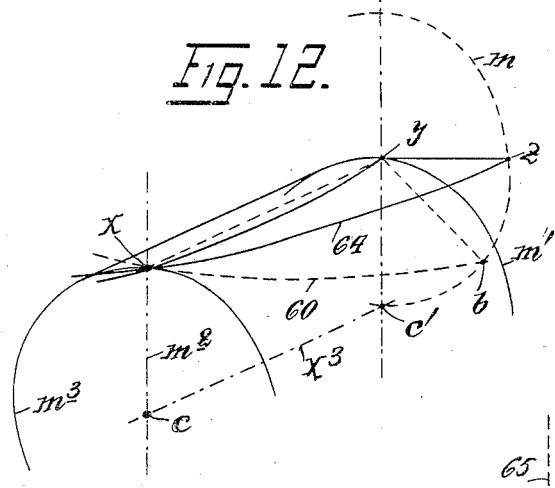
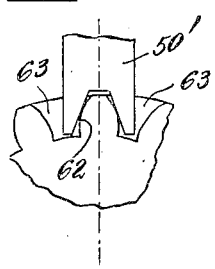
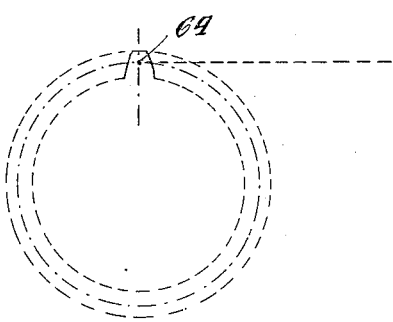
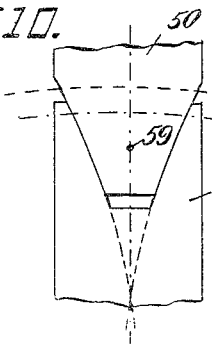
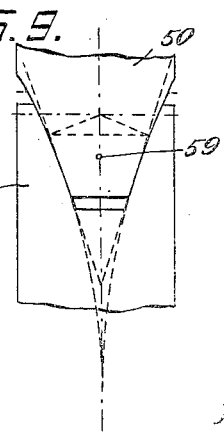
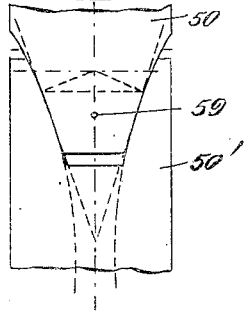
Inventor:
Harvey D. Williams
By his Att'y
John Lotka

UNITED STATES PATENT OFFICE.

HARVEY D. WILLIAMS, OF WALLINGFORD, CONNECTICUT, ASSIGNOR, BY MESNE ASSIGNMENTS, TO SECURITY TRUST COMPANY, OF DETROIT, MICHIGAN, A CORPORATION OF MICHIGAN.

METHOD OF CUTTING LONGITUDINALLY-CURVED TEETH ON GEAR WHEELS.

1,404,504.      Specification of Letters Patent.     Patented Jan. 24, 1922.

Application filed November 4, 1916. Serial No. 129,516.

*To all whom it may concern:*

Be it known that I, HARVEY D. WILLIAMS, a citizen of the United States, and resident of Wallingford, in the county of New Haven and State of Connecticut, have invented certain new and useful Improvements in Methods of Cutting Longitudinally-Curved Teeth on Gear Wheels, of which the following is a specification.

My present invention relates to skew-bevel gear wheels and to skew-spur gear wheels, and has particular reference to wheels in which two successive working tooth-surfaces (whether on the same tooth or at the same tooth-space) constitute a pair related in a particular manner to a "master-form axis" located between the two tooth-surfaces of said pair. My invention is designed chiefly for use in cases in which one of the meshing wheels has its working tooth-surfaces formed according to a single-reproduction configuration, while the other wheel has its working tooth-surfaces formed according to a compound-reproduction configuration. The present application is in part a continuation of my application for Letters Patent filed in the United States Patent Office on July 25, 1914, Serial No. 853,017.

According to the form of my invention disclosed in most of the figures of the drawings of my said pending application, the two surfaces of the same pair, on the wheel having tooth-surfaces of single-reproduction configuration, are similarly located on opposite sides of a rectilinear master-form axis, so that both surfaces of such pair may be produced in a very simple manner, by the rectilinear reciprocation of a tool whose profile corresponds to that of a tooth or of a tooth-space. According to the species of my invention forming the subject-matter of the present application, the two surfaces of the same pair, on the wheel having tooth-surfaces of single-reproduction configuration, are such as may be produced by the motion of a suitable tool along a curvilinear path, and more particularly, along a circular arc, or in other words, the master-form axis is no longer straight, but curved, preferably according to the arc of a circle. The present species of my invention was also described and illustrated in my earlier application above referred to, at the time of its filing.

Reference is to be had to the accompanying drawings, in which Fig. 1 is a side view of a conical blank, for the making of a skew-bevel wheel having tooth-surfaces of single-reproduction configuration with master-form axes of circular curvature; Fig. 2 is a view looking in the direction of the arrow shown in Fig. 1, and represents one pair of tooth-surfaces produced on the conical blank; Fig. 3 shows a bevel pinion having skew tooth-surfaces of compound-reproduction configuration and adapted to mesh with a bevel wheel having tooth-surfaces of the character illustrated by Fig. 2; Fig. 4 shows a spur-pinion (having tooth-surfaces of compound-reproduction configuration) meshing with a spur-wheel (having tooth-surfaces of single-reproduction configuration) made according to my present invention; Fig. 5 is a partial face view of such spur-wheel; Fig. 6 is an end view of the blank for producing the spur-wheel shown in Figs. 4 and 5, illustrating the manner of cutting its tooth surfaces; Figs. 7 to 11 are transverse sections showing different profiles that may be adopted for the teeth or tooth-spaces and for the cutting tools, both in the case of bevel wheels and of spur-wheels; Fig. 12 is a diagram illustrating the location of the master-form axes of the wheels (having tooth-surfaces of single-reproduction configuration) made according to my present invention; and Fig. 13 is a partial face view of another form of my spur-gear.

If a tool 50 having two cutting edges (say such as shown at 51, 52 in Fig. 7) is rotated in a plane tangential to the conical surface of the blank 53, about an axis (say 54) perpendicular to said plane, said edges being at different distances from the axis 54, this operation will cut in the blank 53 a pair of related tooth-surfaces 55, 56 having curved longitudinal elements each of which is a circular arc centered upon the axis 54. When the tool has been fed fully into the blank two corners of the cutting tool, with the transverse edge 57 connecting them, will have produced, in this particular case, the bottom 58 of the tooth-space. The point 59 of the cutter, lying between the edges 51, 52 at equal distances from each, will during the movement of the tool about the axis 54 describe a circular path 60 which may be termed the master-form axis for the pair of related tooth-surfaces 55, 56. It will be understood that during this operation the blank has no motion relatively to the cutter path other than the feeding movement. After cutting one pair of tooth-surfaces in this manner, so-called "indexing" is performed, say by turning the blank through a certain angle about its own axis 61 to a new position, in which another pair of related tooth-surfaces would be cut, and this indexing would be repeated as often as necessary to cut all the teeth of the wheel. It will be obvious that the surfaces such as 55, 56 are formed according to a single-reproduction configuration, since they can be cut by a simple (rotary) movement of a suitable tool while the blank remains stationary. For the sake of simplicity, the term "wheel" will be applied hereinafter specifically to the gear the tooth-surfaces of which are of single-reproduction configuration, and the meshing gear, having tooth-surfaces of compound-reproduction configuration, will be referred to under the name of "pinion," without necessarily implying that the latter is smaller than the mating "wheel."

The pinion is cut by a tool which is a counterpart of the one employed for cutting the wheel, as in the construction forming the main species in my said earlier application. Thus for the male tool 50 employed as the cutter for the tooth-surfaces of the wheel, there would be a counterpart pinion-cutter 50′ having two edges corresponding exactly in profile and relative arrangement to the edges 51, 52, but located on the inner faces of a female cutter. In other words, if the wheel-cutter cuts a pair of surfaces which are at the same tooth-space, as in the example mentioned, then the mating pinion-cutter will cut a pair of surfaces which are on the same tooth. Obviously the arrangement might be reversed; that is to say, the female cutter 50′ might be used as a wheel-cutter, to produce a pair of related tooth-surfaces on the same tooth of the wheel, and in this case the male cutter 50 would be used as the pinion-cutter to produce a pair of related tooth-surfaces at the same tooth-space of the pinion. The shape of the pinion-teeth may be substantially as indicated in Figure 3, the tooth-surfaces 62, 63 being of compound-reproduction configuration. These surfaces may be produced by rotating the pinion-cutter rapidly about an axis located in the same manner relatively to the pinion-blank as has been explained above with reference to the wheel-cutter and wheel-blank, but at the same time the pinion-blank, instead of remaining stationary, would be given a (relatively slow) turning movement about its own axis, and in addition thereto said axis itself would shift relatively to the cutter axis, the motion being of the same general character as described in my earlier application, that is to say, the pinion-blank would roll, as it were, in the same way as if in mesh with the mating wheel.

The shape of the tooth-surfaces, and of the cutters for forming them, may differ widely in transverse outline or section; thus, in Figs. 7 and 8, the cutting edges are straight in transverse outline or section, while in Figs. 9 to 11 the cutting edges are shown curved (concave on the male cutter and convex on the female cutter, although the reverse arrangement might be adopted), Fig. 9 represents the two circular arcs indicating the two cutting edges as tangential to each other and to the line or symmetry-axis passing through the master-form axis 59; in Fig. 10, the two circular arcs will intersect if protracted sufficiently, and in Fig. 11, the two arcs do not intersect or even touch, that is to say, the distance between the centers of said arcs is greater than the sum of their radii. Of course, when the cutting edges are curved, it is not necessary that this curvature (in transverse section) should be circular.

It will be understood that the pinion-blank will be indexed after cutting one tooth, or one tooth-space, as the case may be, until all the tooth-surfaces have been formed. It will be evident that with the procedure described, the working-surfaces of the pinion teeth will be conjugate to the single-reproduction working-surfaces of the wheel-teeth.

Furthermore, it will be manifest that the working-surfaces of the wheel-teeth will contain, or be composed of, longitudinal line elements of circular curvature all parallel to each other (on the same pair of surfaces) and to the master-form axis 60 of such pair.

Fig. 12 illustrates diagrammatically the conditions obtaining in the present invention: If $m^3$ indicates the circular base of the blank, with its center at $c$ and its axis $x^3$, and $m^2$ a radius of the base circle $m^3$, and $c'$ the apex of the conical blank whose base is at $m^3$, with a line $c'$—$y$ drawn parallel to the radius $m^2$ and of equal length, so that the straight dotted line $x$—$y$ connecting the end $x$ of said radius with the point $y$ will be parallel to the axis $x^3$ then let us describe a circle $m$ whose center is at $y$ and whose radius is $y$—$c'$, and through $y$ draw a line $y$—$z$ perpendicular to $y$—$c'$. Then any radius, such as $y$—$b$, drawn between the radii $y$—$c'$ and $y$—$z$, will determine on the circle $m$ a point ($b$) so located that if we connect it with $x$ by a curved line 60 such line may be taken as representing the circular-arc master-form axis explained above, in the case of a skew-bevel gear. If, on the other hand, we consider the two circles $m'$, $m^3$, whose centers are at $c'$, $c$, respectively, and whose radii are equal, as the ends of a cylindrical blank, then the curved line $x$—$z$ may be taken as representing the circular-arc master-form axis 64 of Figs. 5 and 6. The center of curvature for this master form axis, or in other words, in the case of the skew-toothed spur-wheel shown, the axis about which the cutter would rotate while producing a pair of working tooth-surfaces, is indicated at 65. In this case also, the wheel would have tooth-surfaces of single reproduction configuration, and the mating pinion 66 would have tooth-surfaces of compound-reproduction configuration. The manner of cutting the tooth-surfaces of the wheel and of the pinion, and the indexing of the blank relatively to the cutter, would be analogous, in the case of the skew-spur, to the procedure described in connection with the skew-bevel gears.

In all forms of this invention, there might be cases in which the direction of rotation of the meshing gears would always be the same, and in such cases, evidently, only alternate tooth-surfaces would come into play, so that it would be sufficient to form only such alternate tooth-surfaces according to the principle described above, the intervening tooth-surfaces being of any shape affording the necessary clearance.

The main advantage of forming skew-bevel and skew-spur gear wheels with curved longitudinal line elements and with curved master-form axes, as set forth in my present application, instead of employing the rectilinear longitudinal line elements and the straight master-form axes emphasized in my said earlier application, lies in the fact that the latter require the use of reciprocating tools while in the present case a continuous motion in a curvilinear path, and particularly a rotary motion may be employed for the tool, thus enabling me not only to use a higher rate of speed for the motion of the cutter, but also to secure a more rapid cutting action by placing a set of rigidly-connected cutters on the same axis or shaft.

In Fig. 13 I have indicated the production of a herring-bone spur-wheel by setting together two members of the same character as the one shown in Fig. 5, except that one of these members would be right-handed, as it were, and the other left-handed, and these members would preferably be secured together rigidly in the position shown, that is to say, with the teeth of one member in registry with the tooth-spaces of the other member, so as to secure a more gradual meshing of these spur-wheel members with the pinion having corresponding right-hand and left-hand portions, a more even drive resulting therefrom.

Various modifications may be made without departing from the nature of my invention as set forth in the appended claims.

The gears or tooth-surfaces produced according to my improved method are not claimed herein, but in a separate application filed by me on September 20, 1919, Serial No. 325,216.

I claim as my invention:

1. A method of cutting curved teeth on bevel gears consisting in producing a compound reproduction relative movement between the blank and two relatively fixed and offset cutting edges, said movement including a rotary movement of the cutting edges in a plane tangential to the blank and relative rolling movement as of a cone rolling upon another cone between the blank and cutting edges in the same way as if the blank were in mesh with its mating bevel wheel.

2. A method of cutting curved teeth on bevel gears consisting in producing a compound reproduction relative movement between the blank and two relatively fixed and offset cutting edges, said movement including a rotary movement of the cutting edges in a plane tangential to the blank and relative rolling movement of the blank and cutting edges in the same way as if the blank were in mesh with its mating bevel wheel, the rolling movement taking place during the operation of the cutting edges on opposite sides of a gear tooth.

3. A method of producing a curved tooth bevel pinion consisting in relatively moving a pinion blank and cutter to cut a curved slot and producing a relative profile generating movement as of a cone rolling upon another cone between the blank and cutter corresponding to the relative movement of the blank and a mating bevel gear when one is rolling upon the other.

4. A method of producing a curved tooth bevel pinion consisting in giving a curvilinear relative movement to a pinion blank and a cutter of the profile form of the tooth surface of a bevel gear wheel with which said pinion is to mesh, and producing a relative profile generating movement as of a cone rolling upon another cone between the blank and cutter corresponding to the relative movement of the blank and a mating bevel gear when one is rolling upon the other.

5. A method of cutting parallel tooth surfaces on bevel gears consisting in producing a relative movement between the blank and two relatively fixed and offset cutting edges, said movement comprising a rotary movement of the cutting edges about a single axis and in a plane tangential to the blank.

6. A method of cutting curved teeth on bevel gears consisting in producing a compound reproduction relative movement between the blank and two relatively fixed and offset cutting edges, said movement including a rotary movement of the cutting edges in a plane tangential to the blank and relative rolling movement of the blank and cutting edges, the rolling movement taking place during the operation of the two cutting edges on two successive working tooth surfaces of the gear.

7. A method of cutting a pair of longitudinally-curved working tooth-surfaces on a gear, which consists in producing a compound reproduction relative movement between the blank and two relatively-fixed and transversely-offset cutting edges, said movement including a rotary movement of the cutting edges in a direction skew to the axis of the blank and in a plane tangential to the blank, and a relative rolling movement, as of a cone rolling upon another cone, between the said blank and cutting edges in the same way as if the blank were in mesh with its mating gear.

8. A method of cutting a pair of longitudinally-curved parallel working tooth-surfaces of skew direction on a gear, which consists in producing a relative movement between the blank and two relatively-fixed and transversely-offset cutting edges, said movement comprising a rotary movement of said cutting edges in a direction skew to the axis of the blank about a single axis which is perpendicular to a plane tangential to the blank.

In testimony whereof, I have signed this specification.

HARVEY D. WILLIAMS.